Oct. 5, 1948.  E. V. RUPP  2,450,446
OXYGEN WARNING DEVICE
Filed Dec. 12, 1946
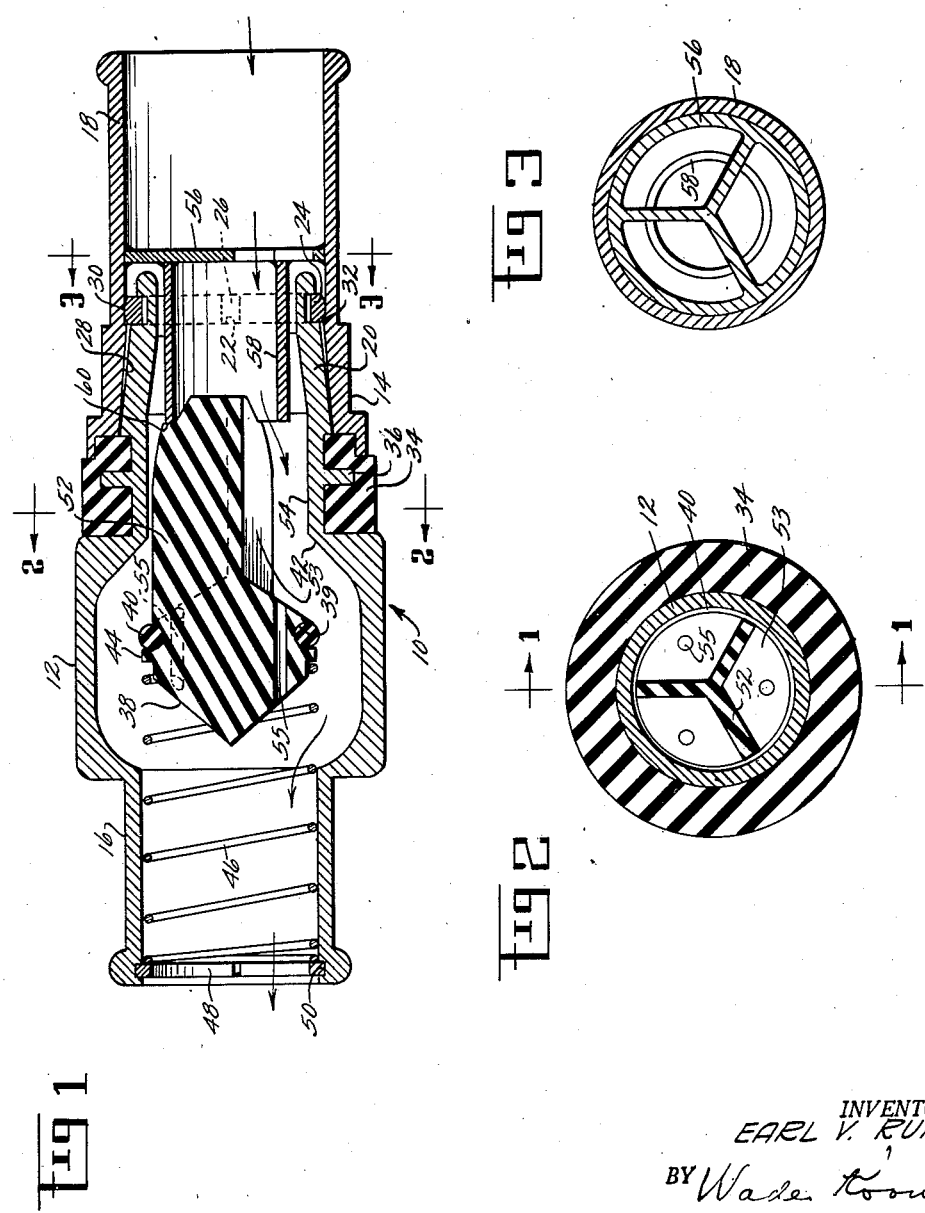
INVENTOR.
EARL V. RUPP
BY Wade Koontz and
Frederick W. Cotterman
— HIS ATTORNEYS —

Patented Oct. 5, 1948

2,450,446

UNITED STATES PATENT OFFICE 2,450,446

OXYGEN WARNING DEVICE

Earl V. Rupp, Dayton, Ohio

Application December 12, 1946, Serial No. 715,785

4 Claims. (Cl. 284—18)

(Granted under the act of March 3, 1883, as amended April 30, 1928; 370 O. G. 757)

The invention described herein may be manufactured and used by or for the Government for governmental purposes without payment to me of any royalty thereon.

This invention relates to aircraft oxygen-breathing equipment and has special reference to a device for warning a user that his oxygen mask has been separated from its source of supply.

In oxygen equipment of this character, the hose which connects the mask to the source of oxygen supply is ordinarily provided with a slip joint, a part of which is carried by the mask and a complementary part by a hose which is connected to the oxygen regulator.

Such a joint must be capable of quick and relatively easy disconnection, and to this end may preferably be so made that disconnection may be effected by merely exerting opposite forces on the separable parts.

Due to faulty construction or wear, or because of improper assembly, however, several fatalities and numerous cases of serious anoxia have occurred while in flight due to unobserved separation of the parts of the joint, which, at extreme altitudes need not be of more than several minutes' duration without danger of resulting in a fatality.

Due to the foregoing inadequacy of the slip joint in current use from a safety standpoint, it was considered necessary to provide a positive locking means for securing the separable parts of the joint so as to make accidental disconnection in flight impossible. The disadvantage of this expedient, however, is that, in cases of emergency, those preparing to bail out are under such a severe nervous strain that some may eject themselves without disconnection from the oxygen system and where a positive lock has been provided for the slip joint this may have serious consequences.

It is therefore an object of this invention to overcome the foregoing inadequacies by providing a slip joint having means to hold the separable parts together against a reasonable separating force, then providing a means to warn the user when the parts become separated without his knowledge.

More specifically it is an object of the invention to incorporate, in the mask end of the oxygen connecting slip joint, a breathing restriction adapted to become effective when the mask end of the joint is separated from the supply end, the restriction to impose only sufficient resistance to breathing to act as a warning, since too complete an obstruction will result in suffocation.

Other objects and advantages will become evident as the invention is more fully described with reference to the drawings, wherein:

Fig. 1 is an axial section taken at 1—1 of Fig. 2 through a joint which contains the improvements which constitute my invention.

Figs. 2 and 3 are transverse sections through the joint taken at 2—2 and 3—3, respectively of Fig. 1.

Like reference characters refer to like parts throughout the several views.

The housing 10 consists of separable parts 12 and 14, the main part 12 being adapted at 16 for connection to an oxygen mask and the lesser part 14 being adapted at 18 for connection to the hose which extends from an oxygen regulator. The right end of the main housing part 12 is in the form of a hollow pilot 20, which at its outer end is provided with an annular groove 22.

A split snap ring 24 is slidably fitted at its sides and loosely fitted at its inside diameter to the groove 22, and has a portion cut away as at 26, whereby the ring 24 may be sprung to a smaller diameter in the groove 22.

The bore of the lesser housing part 14 is internally tapered as at 28, and the ring 24 is externally rounded as at 30, whereby, when the housing part 14 is pushed into place over the pilot 20, the ring 24 will be sprung to a lesser diameter until it snaps in behind the small shoulder 32 in the housing part 14. In this way, it acts as a detent to yieldably hold the two housing parts 12 and 14 assembled. A collar 34 of rubber or the like is stretched over the external flange 36 of the housing part 12 to effect a seal between the two housing parts 12 and 14 when they are assembled.

Concentrically positioned in the housing part 12 is a valve head 38 having an annular groove 39 of half round cross section within which lies a seal ring 40 of rubber or the like which is adapted to make contact with a seat 42 in the housing part 12 when the head 38 is moved rightward.

A flange 44 on the valve head 38 forms a seat for one end of a spring 46, the reaction of the other end of the spring being held by the spring snap ring 48 which is seated in an internal annular groove 50 in the housing part 12.

Extending rightward from the valve head 38, preferably as an integral part thereof, is a three-bladed valve guide 52, the outer edges of the blades being a free fit in the bore 54 of the housing part 12, leaving sectoral passageways 53 between the blades. Holes 55 extending axially through the valve head 38 permit restricted breathing when the housing parts 12 and 14 are separated and the valve head 38 for that reason becomes seated.

For the purpose of keeping the valve head 38 propped to the open position shown as long as the two housing parts remain properly assembled, a wheel or disc 56, spoked as shown or otherwise perforated, is welded or similarly fastened in the bore of the housing part 14, and a short length of tubing 58 is concentrically secured as by welding or similar means to the inner face of the disc, the free end of the tubing being adapted to engage a shoulder 60 formed on the right end of the valve guide 52.

As long, therefore, as the two housing parts are assembled as seen in Fig. 1, the tube 58 will hold the valve head 38 off its seat 42 against the effort of the spring 46 to close it.

When, however, the two housing parts 12 and 14 are separated, the spring 46 will move the valve head 38 rightward and seat the seal ring 40 on the seat 42, after which breathing by the user will be through the holes 55 only.

The size of the holes 55 which will sufficiently restrict breathing at the altitudes at which the device is to be used to warn the user of his disconnection from the oxygen supply without danger of suffocation, may best be determined by experiment. It has been determined that about eight inches of water resistance is required at 35,000 feet altitude at a flow of about 25 litres. This amount of resistance has not been definitely fixed but will be between 4 and 10 inches of water at the flow stated.

While in the embodiment of the invention herein shown and described, I employ a check valve in the mask end of the joint with means in the supply end of the joint to hold the check valve off its seat as long as the separable parts of the joint are assembled in combination with leakage holes through the valve head to provide a restricted breathing passage when the check valve is closed. It will of course be understood that I may employ any type of valve in the mask end of the joint if I also provide means in the supply end of the joint to prop the valve to its open position when the two parts of the joint are assembled and provide suitable leakage means through the valve when it is closed.

Having this view of the scope of my invention, I claim:

1. A slip joint of the character described which comprises a housing in two main separable parts, the first part adapted for connection to an oxygen mask and the second adapted for connection to a source of oxygen supply, detent means to hold the two parts assembled but allow them to pull apart upon application of predetermined opposite forces, valve means in the mask part, means in the supply part adapted when the two parts are assembled to prop the valve means open, and means to permit a predetermined leakage past the valve when it is closed.

2. A slip joint of the character described which comprises a housing in two main separable parts, the first part adapted for connection to an oxygen mask and the second adapted for connection to a source of oxygen supply, yieldable detent means to normally hold the two parts together but allow them to be pulled apart by predetermined oppositely exerted forces, valve means in the mask part biased to the closed position, means in the supply part adapted when the two parts are assembled to prop the valve means open, and means to permit a predetermined leakage past the valve when it is closed.

3. A slip joint of the character described which comprises a housing in two main separable parts, the first part adapted for connection to an oxygen mask and the second adapted for connection to a source of oxygen supply, detent means for yieldably holding the two parts assembled until opposite forces in excess of a predetermined value are applied thereto, valve means in the mask part, a spring urging said valve to close, means in the supply part adapted when the two parts are assembled to prop the valve means open, and means to permit a predetermined leakage past the valve when it is closed.

4. A slip joint which comprises a housing in two telescoping parts, the first part adapted for connection to an oxygen mask and the second part adapted for connection to a source of oxygen supply, detent means for yieldably holding the telescoping parts from axial withdrawal one from the other until forces tending to withdraw them one from the other reach a pretermined value, a check valve in the mask part, a spring in the mask part urging said check valve to the closed position, means in the supply part positioned, when the parts are telescoped, to hold the check valve open and when they are axially withdrawn one from the other to allow said check valve to close, and a passageway through the check valve providing a limited breathing channel when the check valve is closed.

EARL V. RUPP.

REFERENCES CITED

The following references are of record in the file of this patent:

UNITED STATES PATENTS

| Number | Name | Date |
| --- | --- | --- |
| 2,057,624 | Burkhart | Oct. 13, 1936 |
| 2,322,877 | Parker | June 29, 1943 |